(12) United States Patent
Johnson

(10) Patent No.: US 9,148,030 B1
(45) Date of Patent: Sep. 29, 2015

(54) SUPPORT FOR A BATTERY CHARGER AND BATTERY CHARGER ELECTRICAL CABLE

(71) Applicant: Douglas S. Johnson, Huntington Beach, CA (US)

(72) Inventor: Douglas S. Johnson, Huntington Beach, CA (US)

( * ) Notice: Subject to any disclaimer, the term of this patent is extended or adjusted under 35 U.S.C. 154(b) by 40 days.

(21) Appl. No.: 14/257,774

(22) Filed: Apr. 21, 2014

(51) Int. Cl.
*H02J 7/04* (2006.01)
*H02J 7/00* (2006.01)
*F16L 3/06* (2006.01)

(52) U.S. Cl.
CPC *H02J 7/0042* (2013.01); *F16L 3/06* (2013.01)

(58) Field of Classification Search
CPC ........... H02J 7/0044; H02J 7/02; H04M 1/04; H04M 1/0274; B60L 11/1818; B60L 2230/12; H04B 1/3883; Y02T 10/7088; H02G 11/02; H02G 11/00
USPC ............ 248/126, 127, 274.01, 146, 176, 694, 248/51; 320/107, 111–116; 710/303, 304
See application file for complete search history.

(56) References Cited

U.S. PATENT DOCUMENTS

| | | | | |
|---|---|---|---|---|
| 5,923,146 | A * | 7/1999 | Martensson | 320/111 |
| 6,497,382 | B2 * | 12/2002 | King | 242/405.2 |
| D526,272 | S * | 8/2006 | Sade et al. | D13/108 |
| 8,536,827 | B2 * | 9/2013 | Gourley | 320/107 |
| 8,686,683 | B2 * | 4/2014 | Caskey et al. | 320/107 |
| 2003/0111978 | A1 * | 6/2003 | Wang | 320/114 |
| 2011/0084040 | A1 * | 4/2011 | Curtin | 211/126.7 |
| 2011/0169447 | A1 * | 7/2011 | Brown et al. | 320/109 |
| 2011/0187323 | A1 * | 8/2011 | Gourley | 320/111 |
| 2014/0139183 | A1 * | 5/2014 | Baschnagel, III | 320/115 |
| 2014/0274221 | A1 * | 9/2014 | Baschnagel | 455/573 |
| 2014/0319296 | A1 * | 10/2014 | Clouser | 248/206.3 |
| 2015/0018049 | A1 * | 1/2015 | Baschnagel | 455/573 |

OTHER PUBLICATIONS

Jim Young, CableKeeps-for iPad, iPhone, and iPod chargers, Nov. 24, 2011 Kick Starter, https://web.archive.org/web/20111124111808/http://www.kickstarter.com/projects/jay-design/cablekeeps-for-ipad-iphone-and-ipod-chargers?*
Meredyth, Driinn Cell Phone Charging Ledge Review, Jan. 25, 2010 http://the-gadgeteer.com/2010/01/25/driinn-cell-phone-charging-ledge-review/.*

* cited by examiner

*Primary Examiner* — Shin Kim
(74) *Attorney, Agent, or Firm* — Morland C. Fischer

(57) ABSTRACT

A compact support for a battery charger and a cable to be connected from the battery charger to a cell phone or other battery-powered device. The support includes a base on which the battery charger is seated and a stand having a winding hub projecting therefrom. Slots are formed through the base to receive respective terminals (i.e., prongs) of the battery charger to attach the battery charger to the support. The winding hub projecting from the stand has a pair of hub arms and respective tongues which turn away from the arms and each other. The cable of the battery charger is first wrapped around the pair of hub arms so as to lie between the tongues thereof and the stand and then removably retained by one or more notches formed in the stand and one of the tongues of the hub arms.

16 Claims, 2 Drawing Sheets

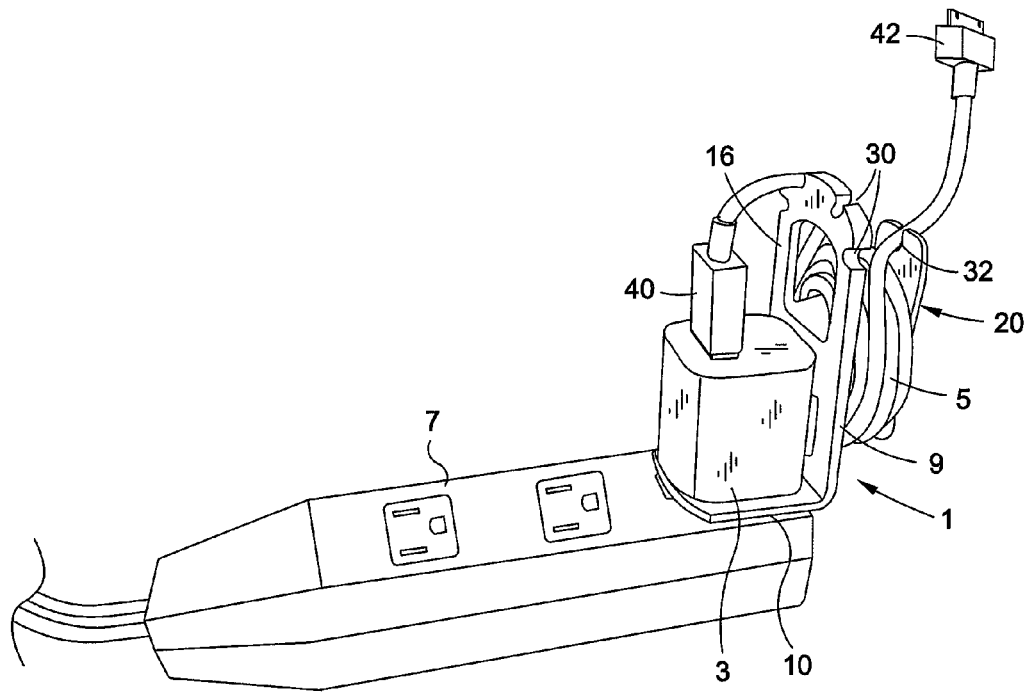
FIG. 1
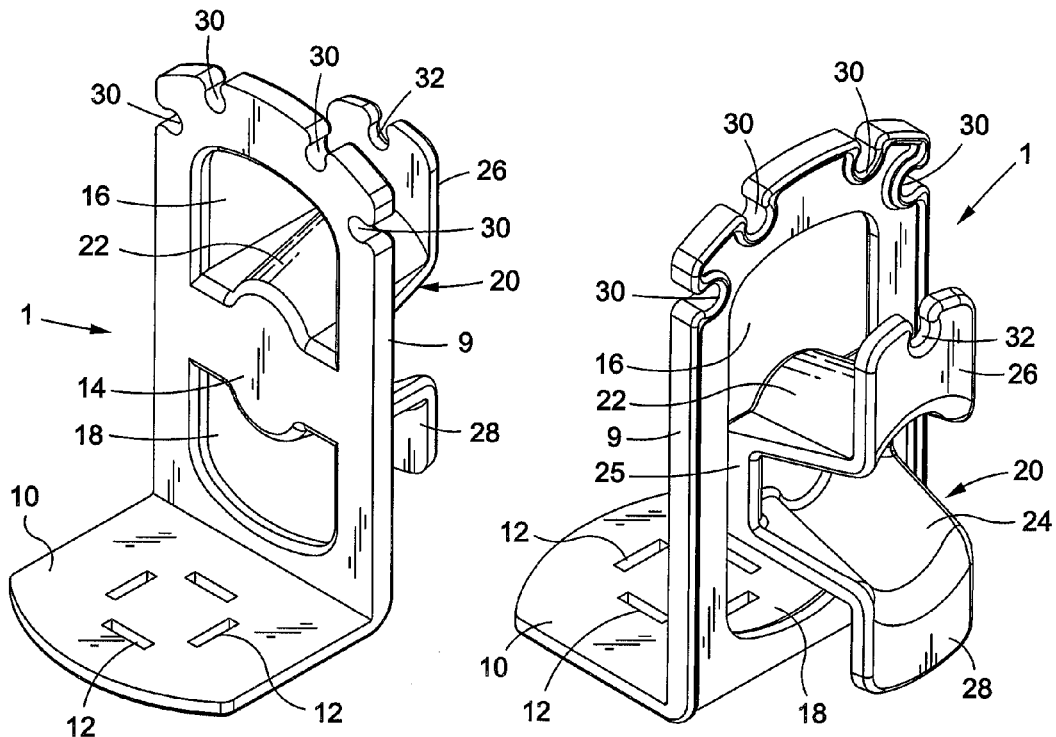
FIG. 2     FIG. 3

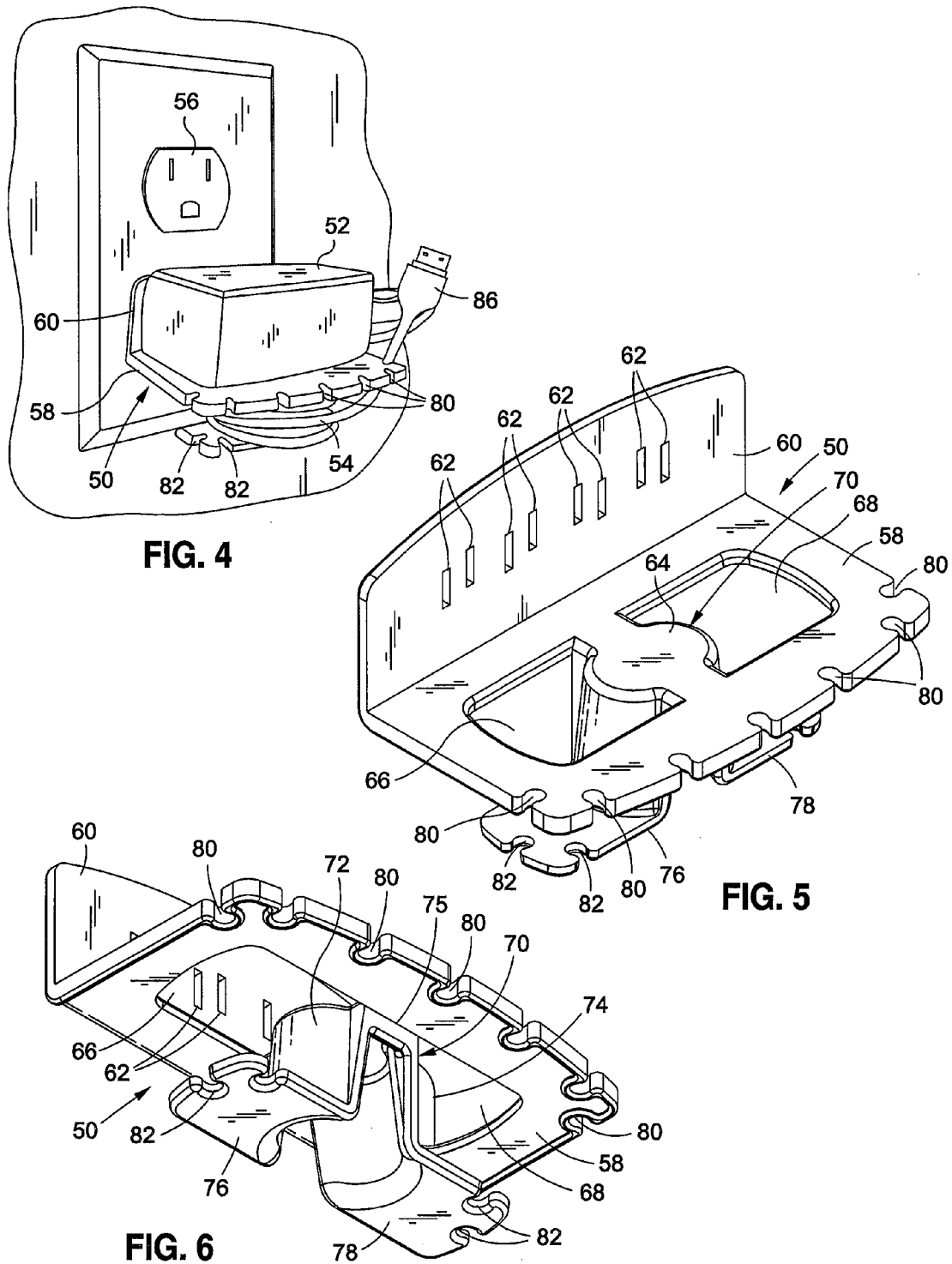

SUPPORT FOR A BATTERY CHARGER AND BATTERY CHARGER ELECTRICAL CABLE

BACKGROUND OF THE INVENTION

1. Field of the Invention

This invention relates to a compact and portable support for a battery charger and a (e.g., USB) electrical cable that is to be connected between the battery charger and a battery-powered device, such as a cell phone. The support includes a winding hub around which the electrical cable is wound so as to avoid the cable being stretched out along the floor and creating a potentially hazardous condition.

2. Background Art

The batteries of portable battery-powered communications, data storage and information processing devices need to be recharged from time-to-time. The foregoing is typically accomplished by means of connecting the battery-powered device to a battery charger by way of an electrical cable. The battery charger is then connected to a source of electrical power such as a wall receptacle or a power strip. However, the electrical cable is often long and known to become tangled. Consequently, a passerby can trip over the cable that is stretched out over a floor between the battery charger and the device being recharged. What is even more, an often unsightly appearance is created by the outstretched cable running along a floor whether or not the battery-powered device is connected thereto.

Accordingly, it would be desirable to eliminate the foregoing problems by being able to hold the battery charger and the battery charger cable close to one another on a compact support that can be conveniently located adjacent the power source to which the battery charger is connected.

SUMMARY OF THE INVENTION

Briefly, and in general terms, disclosed herein is a compact and portable support for a battery charger and an electrical cable that extends from the battery charger for connection to an electrical battery-powered device, such as a cell phone or the like. According to a first preferred embodiment, the support includes a flat base on which the battery charger is positioned. The base includes an array of slots through which to receive terminals (i.e., prongs) of the battery charger so that the battery charger is attached to the support. A stand extends upwardly from the base. A winding hub which projects from the stand includes a pair of spaced hub arms and respective hub tongues which turn away from one another at outstretched ends of the arms. Both the stand and one of the hub tongues have at least one cord notch formed therein. With the battery charger seated on and held in place against the base, the cable of the battery charger is first wrapped around the pair of hub arms so as to lie between the tongues thereof and the stand. The free end of the cable is then removably received and retained by a cord notch formed in the hub tongue. When it is desirable to connect the battery charger to a battery-powered device to recharge the battery thereof, the free end of the cable is detached from the cord notch and connected to the device. The cable is now reconnected to a cord notch from the stand and/or the hub tongue to hold the cable wound around the arms of the winding hub.

According to a second preferred embodiment, the support includes a flat base on which the battery charger is positioned. A back extends upwardly from the base and includes an array of slots through which to receive prongs of the battery charger so that the battery charger is attached to the support. A winding hub which projects downwardly from the base includes a pair of spaced hub arms and respective hub tongues which turn away from one another at the outstretched ends of the arms. Both the base and pair of hub tongues have at least one cord notch formed therein. With the battery charger seated on the base and held in place against the back, the cable of the battery charger is first wrapped around the pair of hub arms so as to lie between the tongues thereof and the base. The free end of the cable is then removably received and retained by a cord notch formed in the base. When it is desirable to connect the battery charger to a battery-powered device, the free end of the cable is detached from the cord notch and connected to the device. The cable is now reconnected to a cord notch from the base and/or one of the pair of hub tongues to hold the cable wound around the arms of the winding hub.

BRIEF DESCRIPTION OF THE DRAWINGS

FIG. 1 is a perspective view of a support for a battery charger and a battery charger cable according to a first embodiment of this invention showing the battery charger attached to and the battery charger cable wound around the support;

FIG. 2 is a top perspective view of the support shown in FIG. 1 with the battery charger and cable removed therefrom;

FIG. 3 is a bottom perspective view of the support shown in FIG. 2;

FIG. 4 is a perspective view of a support for a battery charger and a battery charger cable according to a second embodiment of this invention showing the battery charger attached to and the battery charger cable wound around the support;

FIG. 5 is a top perspective view of the support shown in FIG. 4 with the battery charger and cable removed therefrom; and FIG. 6 is a bottom perspective view of the support shown in FIG. 5.

DESCRIPTION OF THE PREFERRED EMBODIMENT

A convenient and portable support 1 for a battery charger 3 and an electrical cable or cord 5 according to a first preferred embodiment of this invention is described while referring concurrently to FIGS. 1-3 of the drawings. As is best shown in FIG. 1, the support 1 is located between the battery charger 3 and a conventional AC power strip 7. However, the power strip 7 plays no part of the present invention. Therefore, the power strip can be eliminated, such that the battery charger 3 may be plugged directly into any suitable AC wall receptacle (as shown in FIG. 4) by which to enable the battery charger to be powered.

The battery charger 3 is of the kind commonly used to charge the battery of a cell phone or a similar portable communications device. However, the particular application of the battery charger 3 should not be considered as a limitation of this invention, and the support 1 can be interconnected with different battery chargers having applications for powering the rechargeable batteries of a variety of communications as well as data storage and information processing devices.

The battery charger and cable support 1 is preferably manufactured from a durable (e.g., ABS plastic) material. The support 1 has a generally "L"-shaped configuration. More particularly, a stand 9 projects upwardly from a flat mating base 10, such that the stand 9 and base 10 are aligned with one another to form a 90-degree angle. The mating base 10 has an array of slots 12 formed therethrough. The slots 12 are positioned and oriented around the mating base 10 to receive the usual electrical terminals (i.e., prongs) from any one of a variety of battery chargers that will be attached to the support 1 at the base 10 thereof.

A hub mount 14 is located at approximately the center of the stand 9 which projects upwardly from the mounting base 10. The stand 9 is shown having a pair of open windows 16 and 18 lying above and below the hub 14. However, the inclusion of windows 16 and 18 through the stand 9 is optional and intended to reduce the weight of and material required to manufacture the battery charger and cable support 1.

Extending outwardly from the hub mount 14 at the stand 9 of the battery charger and cable support 1 is a winding hub 20 that includes a pair of hub arms 22 and 24. The hub arms 22 and 24 and the mating base 10 project in opposite directions from the stand 9 of support 1. The arms 22 and 24 of winding hub 20 are held in spaced alignment with one another by means of opposing brace members 25 (best shown in FIG. 3) that are co-extensively connected to each of the hub arms 22 and 24 and the stand 9. An upper hub tongue 26 turns outwardly and in a first direction from the outstretched end of the hub arm 22 of winding hub 20, and a lower hub tongue 28 turns outwardly and in an opposite direction from the outstretched end of the hub arm 24.

A plurality of cord notches or grooves 30 are formed in the stand 9 of the battery charger and cable support 1. In a preferred embodiment, the cord notches 30 are spaced from one another along the top of the stand 9. An additional cord notch or groove 32 is formed in at least the upturned tongue 26 that is carried by the first arm 22 of winding hub 20.

The use of the battery charger and cable support 1 to carry the battery charger 3 and enable the electrical cable 5 thereof to be conveniently wrapped around the winding hub 20 to create a compact charging arrangement is now described while continuing to refer to FIGS. 1-3. By way of example only, FIG. 1 shows a USB connector 40 located at one end of a USB cable 5 and connected to the battery charger 3. Another electrical connector 42 is located at the opposite free end of cable 5. In the case where the battery of a cell phone (not shown) is to be charged, the electrical connector 42 is a common cell phone connector.

Prior to the cell phone being coupled to the battery charger 3 at connector 42, the battery charger is initially positioned upon the flat mating base 10 of the support 1 such that the electrical prongs of charger 3 are inserted through respective slots 12 formed through base 10. The battery charger 3 can now be plugged directly into an electrical wall receptacle or into the power strip 7 shown in FIG. 1. The dangling USB cable 5 is then fed through one of the cord notches 30 along the top of the stand 9 adjacent which the battery charger 3 is seated. Next, the cable 5 is wound around the arms 22 and 24 of the winding hub 20 so as to lie between the hub tongues 26 and 28 and the stand 9. The outwardly turned hub tongues 28 and 32 prevent the cable 5 from sliding off the hub 20. The free end of cable 5 is removably and temporarily held in place by the cord notch 32 that is formed in the upper hub tongue 26 of the arm 22 of the winding hub 20 in the manner shown in FIG. 1.

When it is desirable to connect the cell phone (or other battery-powered device) to the battery charger 3, the cable 5 is detached from the cord notch 32, and the cell phone connector 42 is mated to the cell phone. However, it may first be necessary to partially unwind the cable 5 from the winding hub 20. The cable 5 may then be reconnected to the cord notch 32 formed in the tongue 26.

It is to be understood that the cell phone can be attached to the connector 42 of USB cable 5 at any time, and the order in which the aforementioned phone charging arrangement is completed is not to be considered a limitation of this invention. Regardless of the order of completion, the battery charger and cable support 1 herein disclosed enables the USB cable 5 to be advantageously wound up and retained (by means of cord notches 30 and 32) next to the battery charger in a compact and tidy charging package alongside the battery charger 3. Similarly, the cable 5 can be easily unwound as needed. By virtue of the foregoing, the length of the USB cable 5 which runs between the battery charger 3 and the cell phone coupled thereto is no longer stretched out across a floor to create a potentially hazardous condition. Moreover, tangles in the cable are now more easily avoided as is the often unsightly appearance created thereby.

A second convenient and easy-to-use support 50 for a battery charger 52 and an electrical cable 54 according to another preferred embodiment of this invention is now described while referring concurrently to FIGS. 4-6 of the drawings. As is best shown in FIG. 4, the support 50 is located between the battery charger 52 and a standard AC wall receptacle. The battery charger 52 may be the same as or different than that shown in FIG. 1 for powering a variety of communications as well as data storage and information processing devices.

Like the support 1 of FIGS. 1-3, the battery charger and cable support 50 of FIGS. 4-6 is manufactured from a durable (e.g., plastic) material and has a generally "L-"shaped configuration. The support 50 includes a flat base 58 and a mating back 60 which stands upwardly from the base 58. Therefore, the base 58 and the back 60 are aligned with one another to form a 90-degree angle. The upstanding back 60 has an array of slots 62 formed therethrough. The slots 62 are positioned and oriented along the mating back 60 to receive the usual electrical terminals (i.e., prongs) from the battery charger.

A hub mount 64 is located at approximately the center of the base 58. The base 58 is shown having a pair of optional windows 66 and 68 formed therethrough. Similar to the support 1 of FIGS. 1-3, a winding hub 70 extends outwardly from the base 58 of the battery charger and cable support 50. The winding hub 70 includes a pair of hub arms 72 and 74. The hub arms 72 and 74 and the mating back 60 project in opposite directions from the base 58 of support 1. The arms 72 and 74 of winding hub 70 are held in spaced alignment with one another by means of opposing brace members 75 (best shown in FIG. 6) that are co-extensively connected to each of the hub arms 72 and 74 and the base 58. A first hub tongue 76 turns outwardly and in a first direction from the outstretched end of the hub arm 72 of winding hub 70, and a second hub tongue 78 turns outwardly and in an opposite direction from the outstretched end of the hub arm 74.

A plurality of cord notches or grooves 80 are formed in the base 58 of the battery charger and cable support 50. In a preferred embodiment, the cord notches 80 are spaced from one another along and around the outside of the base 58. One or more additional cord notches or grooves 82 are formed in each of the tongues 76 and 78 that are carried by and turn outwardly from the hub arms 72 and 74 of the winding hub 70.

The use of the battery charger and cable support 50 to carry the battery charger 52 and enable the electrical cable 54 thereof to be conveniently wrapped around the winding hub 70 to create a compact charging arrangement is now described while continuing to refer to FIGS. 4-6. By way of example only, a USB connector (not shown) that is located at one end of a USB cable 54 is connected to the battery charger 52. Another electrical connector 86 (best shown in FIG. 4) is located at the opposite free end of cable 54. In the case where the battery of a cell phone is to be charged, the electrical connector 86 to be attached to the cell phone is a common cell phone connector.

The battery charger 52 is initially positioned upon the flat base 58 of the support 50 such that the electrical prongs of charger 52 are inserted through respective slots 62 formed through the mating back 60. The battery charger 52 can now be plugged directly into the electrical wall receptacle 56 as shown in FIG. 4. Prior to the cell phone being coupled to the battery charger 52, the dangling USB cable 54 which extends from the battery charger 52 is wound around the arms 72 and 74 of the winding hub 70 so as to lie between the hub tongues 76 and 78 and the base 58. The outwardly turned hub tongues 76 and 78 prevent the cable 54 from sliding off the hub 70. The free end of cord 54 is then removably and temporarily held in place by any one of the cord notches 80 formed in the base 58 in the manner shown in FIG. 4.

When it is desirable to connect the cell phone (or other battery-powered device) to the battery charger 52, the cable 54 is detached from its cord notch 80, and the cell phone connector 86 is attached to the cell phone. However, as in the case of the battery charger and cable support 1 previously described, it may first be necessary to partially unwind the cable 54 from the winding hub 70. Once the cell phone has been coupled to the battery 52 for charging, the cable 54 can be rewound around the winding hub 70 and fed through one of the cord notches 82 formed in one of the hub tongues 76 or 78.

Like the support 1 shown in FIGS. 1-3, the battery charger and cable support 50 shown in FIGS. 4-6 enables the USB cable 5 to be advantageously wound up and retained (by means of cord notches 80 and 82) in a compact and tidy charging package alongside the battery charger 52 prior to and after the cell phone has been attached to the battery charger so as to avoid tangling of the cord, a potentially hazardous condition, and an often unsightly appearance.

The invention claimed is:

1. A support for a battery charger and an electrical cord connected at one end thereof to the battery charger and at the opposite end to a connector to be attached to a battery-powered device, said support comprising:
   a base upon which the battery charger is to be positioned, said base having a plurality of slots formed therein and being sized for the receipt therethrough of electrical terminals of the battery charger by which the battery charger is attached to said support;
   a stand connected to said base and having at least a first cord retaining notch formed therein; and
   a winding hub connected to said stand for the winding receipt therearound of the electrical cord of the battery charger,
   the first cord retaining notch of said stand located in proximity to said winding hub and being sized so as to removably receive and retain the electrical cord therewithin.

2. The support recited in claim 1, wherein said base projects from said stand in a first direction and said winding hub projects from said stand in an opposite direction.

3. The support recited in claim 1, wherein said winding hub connected to said stand includes at least one hub arm projecting away from said stand for the winding receipt therearound of the electrical cord.

4. The support recited in claim 3, wherein the at least one hub arm of said winding hub includes a tongue which turns away from said hub arm and is spaced from said stand whereby the electrical cord to be received around the hub arm of said winding hub will lie between said stand and the tongue of said hub arm.

5. The support recited in claim 4, wherein the tongue of said at least one hub arm of said winding hub has a second cord receiving notch formed therein and sized so as to removably receive and retain the electrical cord therewithin.

6. The support recited in claim 1, wherein said winding hub connected to said stand includes a pair of hub arms that are spaced from one another and project away from said stand for the winding receipt therearound of the electrical cord.

7. The support recited in claim 6, wherein the pair of hub arms of said winding hub include respective tongues which turns away from said arms, said tongues extending in opposite directions relative to one another and being spaced from said stand whereby the electrical cord to be received around the pair of hub arms of said winding hub will lie between said stand and said tongues.

8. The support recited in claim 7, wherein there is a second cord receiving notch formed in at least one of the tongues of the pair of hub arms of said winding hub and sized so as to removably receive and retain the electrical cord therewithin.

9. A support for a battery charger and an electrical cord connected at one end thereof to the battery charger and at the opposite end to a connector to be mated to a battery-powered device, said support comprising:
   a base upon which the battery charger is to be positioned, said base having at least a first cord retaining notch formed therein;
   a back connected to said stand and having a plurality of slots formed therein that are sized for receipt therethrough of electrical terminals of the battery charger by which the battery charger is attached to said support; and
   a winding hub connected to said base for the winding receipt therearound of the electrical cord of the battery charger,
   the first cord retaining notch of said base located in proximity to said winding hub and being sized so as to removably receive and retain the electrical cord therewithin.

10. The support recited in claim 9, wherein said back projects from said base in a first direction and said winding hub projects from said base in an opposite direction.

11. The support recited in claim 9, wherein said winding hub connected to said base includes at least one hub arm projecting away from said base for the winding receipt therearound of the electrical cord.

12. The support recited in claim 11, wherein the at least one hub arm of said winding hub includes a tongue which turns away from said hub arm and is spaced from said base whereby the electrical cord to be received around the hub arm of said winding hub will lie between said base and the tongue of said hub arm.

13. The support recited in claim 12, wherein the tongue of said at least one hub arm of said winding hub has a second cord receiving notch formed therein and sized so as to removably receive and retain the electrical cord therewithin.

14. The support recited in claim 9, wherein said winding hub connected to said base includes a pair of hub arms that are spaced from one another and project away from said base for the winding receipt therearound of the electrical cord.

15. The support recited in claim 14, wherein the pair of hub arms of said winding hub include respective tongues which turns away from said arms, said tongues extending in opposite directions relative to one another and being spaced from said base whereby the electrical cord to be received around the pair of hub arms of said winding hub will lie between said stand and said tongues.

16. The support recited in claim 15, wherein there is a second cord receiving notch formed in at least one of the tongues of the pair of hub arms of said winding hub and sized so as to removably receive and retain the electrical cord therewithin.

\* \* \* \* \*